United States Patent
Akino et al.

(10) Patent No.: US 8,218,806 B2
(45) Date of Patent: Jul. 10, 2012

(54) UNIDIRECTIONAL CONDENSER MICROPHONE UNIT

(75) Inventors: Hiroshi Akino, Machida (JP); Shioto Okita, Machida (JP); Noriko Matsui, Machida (JP); Satoshi Yoshino, Machida (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 409 days.

(21) Appl. No.: 12/656,251

(22) Filed: Jan. 22, 2010

(65) Prior Publication Data

US 2010/0189298 A1 Jul. 29, 2010

(30) Foreign Application Priority Data

Jan. 29, 2009 (JP) ................................. 2009-017802

(51) Int. Cl.
*H04R 25/00* (2006.01)
(52) U.S. Cl. .......................... 381/355; 381/369; 381/174
(58) Field of Classification Search .................. 381/355, 381/356, 357, 358, 359, 360, 367, 369, 174, 381/175, 189; 455/301, 575.8; 361/816, 361/818

See application file for complete search history.

(56) References Cited

U.S. PATENT DOCUMENTS

| 8,116,498 | B2* | 2/2012 | Akino et al. | 381/355 |
| 2006/0078148 | A1* | 4/2006 | Akino | 381/369 |
| 2009/0257613 | A1* | 10/2009 | Khamashta et al. | 381/355 |
| 2010/0189301 | A1* | 7/2010 | Akino et al. | 381/369 |

* cited by examiner

*Primary Examiner* — Huyen D Le
(74) *Attorney, Agent, or Firm* — Manabu Kanesaka

(57) ABSTRACT

There is provided a unidirectional condenser microphone unit in which the shield performance of a rear acoustic terminal is assured by simple assembling work without an increase in cost. In a unidirectional condenser microphone unit in which an electrostatic acousto-electric converter is incorporated in a cylindrical, metallic unit case having a front acoustic terminal on the front surface thereof and a rear acoustic terminal on the side surface thereof, and a shielding member 40 for the rear acoustic terminal is provided in the unit case, as the shielding member 40, a shielding plate 42 consisting of a band-shaped and elastic porous metal plate, which has a length La longer than the inner periphery length of the unit case, and is provided with a plurality of tongue pieces 42R1 to 42R3 and 42L1 to 42L3 divided by slits 421 parallel with the lengthwise direction in both end parts 42R and 42L in the lengthwise direction, is used; and the shielding plate 42 is disposed in the unit case 10 in the state in which the shielding plate 42 is formed in a cylindrical shape by overlapping the tongue pieces 42R1 to 42R3 and 42L1 to 42L3 in both the end parts 42R and 42L alternately.

3 Claims, 3 Drawing Sheets

UNIDIRECTIONAL CONDENSER MICROPHONE UNIT

CROSS-REFERENCE TO RELATED APPLICATION

The present application is based on, and claims priority from, Japanese Application Serial Number JP2009-017802, filed Jan. 29, 2009, the disclosure of which is hereby incorporated by reference herein in its entirety.

TECHNICAL FIELD

The present invention relates to a unidirectional condenser microphone unit having a front acoustic terminal and a rear acoustic terminal. More particularly, it relates to a shielding member provided on the rear acoustic terminal.

BACKGROUND ART

As shown in FIG. 4, a unidirectional condenser microphone unit has a cylindrically formed unit case 10 made of, for example, a brass alloy. On the front surface, which is directed to the sound source side, of the unit case 10, a front acoustic terminal 11 is provided, and on the side surface (circumferential surface) side thereof, a rear acoustic terminal 12 is provided to provide unidirectionality.

The front acoustic terminal 11 and the rear acoustic terminal 12 are openings for introducing sound waves into the unit case 10, and usually adopt round holes or slit holes.

In the unit case 10, an acousto-electric converter 20 is housed. This acousto-electric converter 20 is of an electrostatic type. Although not shown, in the acousto-electric converter 20, a diaphragm stretchedly provided on a diaphragm ring and a backplate supported on an insulating seat are disposed oppositely via an electrical insulating spacer ring.

The acousto-electric converter 20 is disposed between the front acoustic terminal 11 and the rear acoustic terminal 12 in the unit case 10, and an electrode terminal rod 21 connected electrically to the backplate is pulled out of the rear of the acousto-electric converter 20.

Since the electrostatic acousto-electric converter 20 has a very high impedance, the condenser microphone has an impedance converter 30 for converting sound signals to ones having a low impedance and sending out the converted sound signals. As the impedance converter 30, a field effect transistor (FET) is usually employed. Therefore, in the description below, the impedance converter is sometimes referred to as a FET 30.

The condenser microphone unit shown in FIG. 4 is used for a tie clip condenser microphone or a gooseneck condenser microphone. The FET 30 is housed in the unit case 10 in a state of being mounted on a circuit board 31, and the gate electrode thereof is connected electrically to the electrode terminal rod 21 via, for example, a plate spring 33.

To the circuit board 31, a microphone cord (not shown) is connected. The microphone cord is pulled out of the cord bush 13 side at the rear end of the unit case 10, and is connected to a power module section (not shown) including a sound signal output circuit and an output transformer.

Since the front acoustic terminal 11 and the rear acoustic terminal 12 are openings, a shielding member 40 having air permeability is provided on the front acoustic terminal 11 and the rear acoustic terminal 12 to prevent foreign matters from intruding into the unit case 10 and to prevent noise caused by the external electric field from being generated (for example, refer to Japanese Patent Application Publication No. S55-105492). In FIG. 4, the illustration of the shielding member provided on the front acoustic terminal 11 side is omitted.

The noise caused by the external electric field includes hum noise caused by a commercial power source at low frequencies and noise caused by broadcasting electromagnetic waves at relatively high frequencies. In recent years, noise caused by electromagnetic waves of very high frequencies radiated from cellular phones has posed a serious problem.

Usually, as the shielding member 40 of the rear acoustic terminal 12, a metal mesh 41 such as a stainless steel mesh (wire diameter: 0.1 mm, #100 mesh, material: SUS304) has been used. The metal mesh 41 is schematically shown in FIG. 5.

The metal mesh 41 is a plain-woven mesh body, so that the metal mesh 41 is electrically connected by contact points between longitudinal wires and transverse wires. For this reason, the electrical connection states of the contact points are not always fixed. Therefore, the shield performance of the metal mesh 41 is also nonuniform throughout the entire surface thereof. For example, the electrical resistance values at the contact points vary depending on whether the weaving is strong or weak.

As shown in FIG. 5, the metal mesh 41, which is formed by cutting a metal mesh into a band shape, is put into the unit case 10 by being rounded, and is mounted on the inner surface side of the rear acoustic terminal 12 by the elastic restoring force thereof. The metal mesh 41 mounted in this manner has a problem described below.

In the case where the length of the metal mesh 41 is shorter than the inner periphery length of the unit case 10, as shown in FIGS. 6A and 6B, a gap G1 is formed between both end parts of the metal mesh 41, and therefore the shield is incomplete in the part of this gap G1.

In contrast, in the case where the length of the metal mesh 41 is longer than the inner periphery length of the unit case 10, as shown in FIGS. 7A and 7B, both the end parts of the metal mesh 41 overlap with each other, and one end part thereof floats from the inner surface of the unit case 10 and a gap G2 is formed. Therefore, the shield is incomplete in the part of this gap G2.

If the metal mesh 41 is cut so as to fit to the inner periphery length of the unit case 10, the gaps G1 and G2 are not formed. However, this process requires a precise cutting machine or skilled work.

In addition, in the case where the restoring force of the metal mesh 41 is weak, and the contact pressure on the unit case 10 is low as well, the shield is incomplete.

Concerning the contact pressure, Japanese Patent Application Publication No. 2008-166909 proposes a technique in which a coil spring for pressing the metal mesh 41 against the inner surface of the unit case 10 is put in the unit case 10. According to this technique, the shield performance of the rear acoustic terminal 12 can be enhanced. However, this technique is unpreferable in terms of cost because of the need for the coil spring.

Accordingly, an object of the present invention is to provide a unidirectional condenser microphone unit in which the shield performance of the rear acoustic terminal is assured by simple assembling work without an increase in cost.

SUMMARY OF THE INVENTION

To achieve the above object, the present invention provides a unidirectional condenser microphone unit in which an acousto-electric converter configured so that a diaphragm and a backplate are arranged oppositely via an electrical insulating spacer is incorporated in a cylindrical, metallic unit case having a front acoustic terminal on the front surface thereof and a rear acoustic terminal on the side surface thereof, and a permeable shielding member that covers the rear acoustic terminal from the inside is provided in the unit case, wherein as the shielding member, a shielding plate consisting of a band-shaped and elastic porous metal plate, which has a length longer than the inner periphery length of the unit case, and is provided with a plurality of tongue pieces divided by a slit parallel with the lengthwise direction in both end parts in the lengthwise direction, is used; and the shielding plate is disposed in the unit case in the state in which the shielding plate is formed in a cylindrical shape by overlapping the tongue pieces in both the end parts alternately.

In the present invention, the length of the slit is not shorter than the difference between the length of the shielding plate and the inner periphery length of the unit case.

According to a preferable mode of the present invention, the shielding plate is a 0.1 mm thick stainless steel sheet in which 0.3 mm diameter holes are formed in a zigzag pattern at a pitch distance of 0.6 mm.

According to the present invention, as the shielding member that covers the rear acoustic terminal, the shielding plate consisting of a band-shaped and elastic porous metal plate, which has a length longer than the inner periphery length of the unit case, and is provided with the plurality of tongue pieces divided by a slit parallel with the lengthwise direction in both the end parts in the lengthwise direction, is used; and the shielding plate is disposed in the unit case in the state in which the shielding plate is formed in a cylindrical shape by overlapping the tongue pieces in both the end parts alternately. Therefore, the gaps G1 and G2 shown in FIGS. 6B and 7B are not formed. Thereby, the shield can be made complete, and the shield plate can be brought into close contact with the inner surface of the unit case.

Also, since the shielding plate consists of an elastic porous metal plate (punching metal) having no intersections of longitudinal wires and transverse wires unlike the conventional metal mesh, shield performance that is uniform throughout the entire surface is provided.

Also, as for the assembling as well, since the shielding plate can be formed in a cylindrical shape merely by overlapping the tongue pieces in both end parts alternately, the assembling work can be performed easily. Further, since the porous metal plate is pressed against the inner surface of the unit case by an elastic restoring force stronger than that of the metal mesh, an auxiliary means such as a coil spring is unnecessary.

DETAILED DESCRIPTION

Figure 1A:
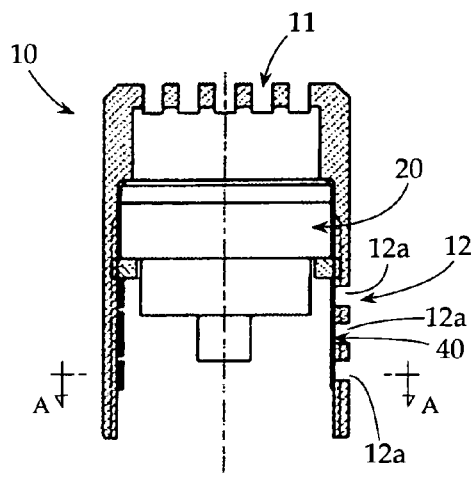
FIG. 1A is a longitudinal sectional view showing an essential portion in which a shielding plate in accordance with the present invention is mounted on a unit case.

An embodiment of the present invention will now be described with reference to FIGS. 1 to 3. The present invention is not limited to this embodiment. In the description of this embodiment, the same reference numerals are applied to elements that are the same or are regarded as the same as the elements in the conventional example shown in FIG. 4. In FIG. 1A showing this embodiment, the illustration of configurations including the impedance converter (FET) 30 shown in FIG. 4 is omitted.

Referring to FIG. 1A, the unidirectional condenser microphone unit in accordance with the present invention has, like the conventional example, a cylindrically formed unit case 10 made of, for example, a brass alloy.

Since the unidirectional condenser microphone unit has unidirectionality, on the front surface, which is directed to the sound source side, of the unit case 10, a front acoustic terminal 11 is provided, and on the side surface (circumferential surface) side thereof, a rear acoustic terminal 12 is provided. The front acoustic terminal 11 and the rear acoustic terminal 12 are openings for introducing sound waves into the unit case 10, and usually adopt round holes or slit holes.

Figure 1B:
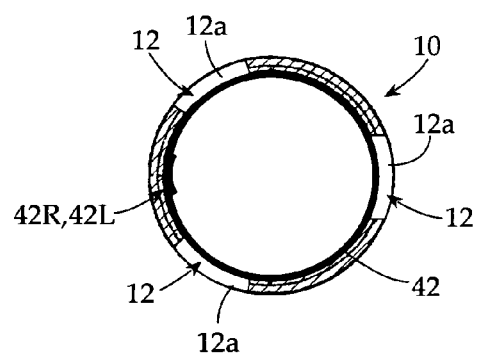
FIG. 1B is a transverse sectional view taken along the line A-A of FIG. 1A.

In this embodiment, as shown in FIG. 1B, the rear acoustic terminal 12 is disposed at three places in the unit case 10 at intervals of 120 degrees in the circumferential direction, and consists of three-stage slit holes 12a each formed in the direction perpendicular to the axis line of the unit case 10.

In the unit case 10, an acousto-electric converter 20 is housed. This acousto-electric converter 20 is of an electrostatic type. Although not shown, in the acousto-electric converter 20, a diaphragm stretchedly provided on a diaphragm ring and a backplate supported on an insulating seat are disposed opposedly via an electrical insulating spacer ring.

The acousto-electric converter 20 is disposed between the front acoustic terminal 11 and the rear acoustic terminal 12 in the unit case 10, and an electrode terminal rod 21 connected electrically to the backplate is pulled out of the rear of the acousto-electric converter 20.

On the front acoustic terminal 11 and the rear acoustic terminal 12, a shielding member 40 having air permeability is provided to prevent foreign matters from intruding into the unit case 10 and to prevent noise caused by the external electric field from being generated. In FIG. 1A, the illustration of the shielding member provided on the front acoustic terminal 11 side is omitted.

Figure 2:
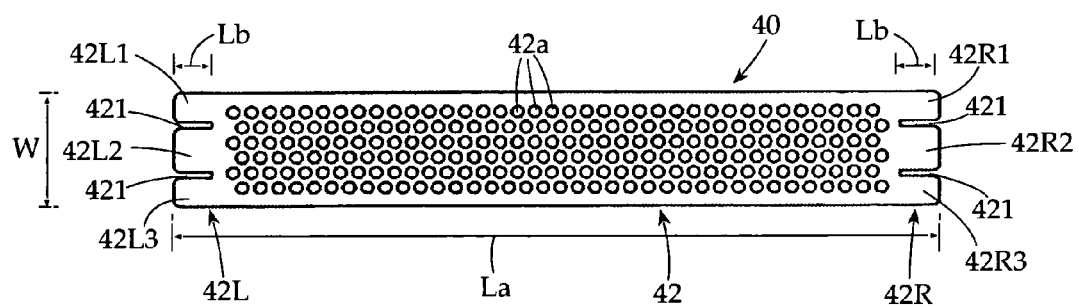
FIG. 2 is a plan view of a shielding plate used in the present invention.

Referring to FIG. 2, in the present invention, as the shielding member 40 of the rear acoustic terminal 12, a shielding plate 42 consisting of an elastic porous metal plate (punching metal) is used.

The shielding plate 42 is a band plate having a width W such as to cover all of the three-stage slit holes 12a and a length La not shorter than the inner periphery length of the unit case 10. The thickness of the shielding plate 42 is about 0.1 mm, and the material thereof is preferably stainless steel (SUS304).

The shielding plate 42 is formed with a large number of holes 42a. To shield electromagnetic waves radiated from cellular phones and the like, it is preferable that the holes 42a each have a diameter of 0.3 mm and are arranged in a zigzag pattern at a pitch distance of 0.6 mm.

One end on the end part 42R side (the right end in FIG. 2) and the other end on the end part 42L side (the left end in FIG. 2) of the shielding plate 42 each are divided into a plurality of tongue pieces by slits 421.

In order to allow the shielding plate 42 to be rounded into a cylindrical shape having a diameter smaller than the inside diameter of the unit case 10, the length (depth) Lb of each of the slits 421 parallel to the length La of the shielding plate 42 is not smaller than the difference between the length La of the shielding plate 42 and the inner periphery length of the unit case 10.

In this embodiment, one end part 42R is divided into three tongue pieces 42R1, 42R2 and 42R3 by the two slits 421, and similarly, the other end part 42L is divided into three tongue pieces 42L1, 42L2 and 42L3 by the two slits 421.

In this case, to allow the tongue pieces to overlap with each other alternately, the widths of the tongue pieces opposed in the end parts 42R and 42L are made the same.

Specifically, the tongue piece 42R1 of the end part 42R and the tongue piece 42L1 of the end part 42L, the tongue piece 42R2 of the end part 42R and the tongue piece 42L2 of the end part 42L, and the tongue piece 42R3 of the end part 42R and the tongue piece 42L3 of the end part 42L, respectively, are made so as to have the same width. All of the tongue pieces 42R1 to 42R3 and 42L1 to 42L3 may have the same width.

When the shielding plate 42 is put into the unit case 10 and mounted on the rear acoustic terminal 12, the tongue pieces 42R1 to 42R3 and the tongue pieces 42L1 to 42L3 are overlapped respectively with each other alternately so that the shielding plate 42 is formed in a cylindrical shape having a diameter smaller than the inside diameter of the unit case 10.

Figure 3:
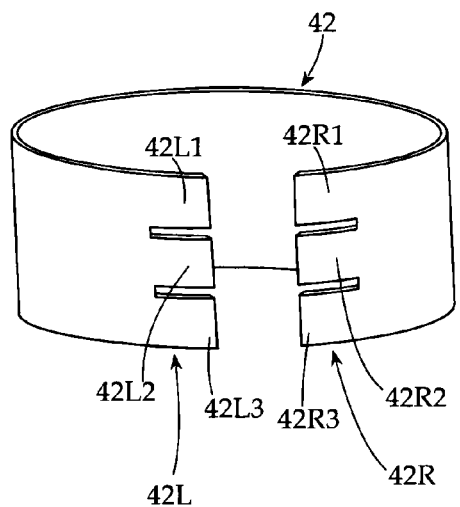
FIG. 3 is a perspective view showing a state in which the shielding plate shown in FIG. 2 is formed in a cylindrical shape.
Figure 4:
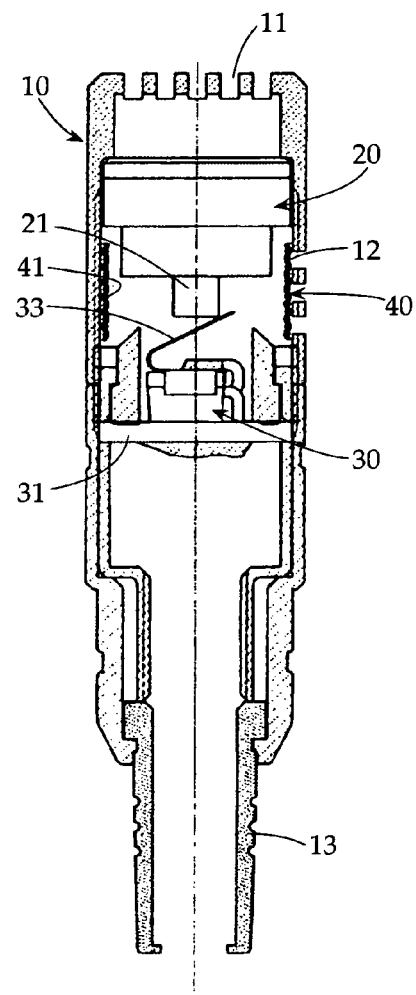
FIG. 4 is a longitudinal sectional view showing an internal configuration in a conventional example of a unidirectional condenser microphone unit.
Figure 5:
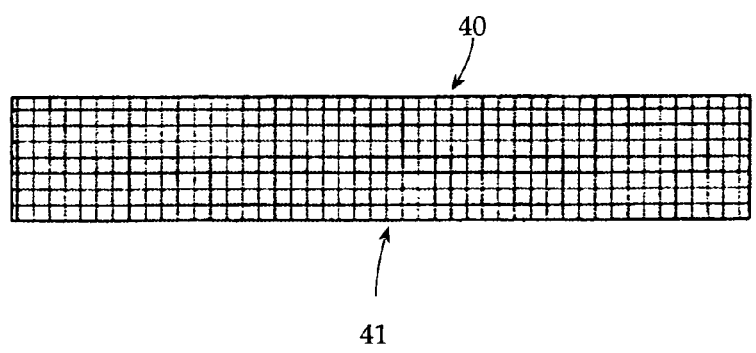
FIG. 5 is a plan view schematically showing a metal mesh used in the conventional example shown in FIG. 4.

In FIG. 3, for example, if the tongue pieces 42R1 and 42R3 on the end part 42R side are overlapped over (on the outer surface side of) the tongue pieces 42L1 and 42L3 on the end part 42L side, respectively, the tongue piece 42R2 on the end part 42R is overlapped, that is, caused to crawl under (on the inner surface side of) the tongue piece 42L2 on the end part 42L side to form the shielding plate 42 in a cylindrical shape having a diameter smaller than the inside diameter of the unit case 10.

In contrast, if the tongue pieces 42R1 and 42R3 on the end part 42R side are overlapped, that is, caused to crawl under (on the inner surface side of) the tongue pieces 42L1 and 42L3 on the end part 42L side, respectively, the tongue piece 42R2 on the end part 42R is overlapped over (on the outer surface side of) the tongue piece 42L2 on the end part 42L side to form the shielding plate 42 in a cylindrical shape having a diameter smaller than the inside diameter of the unit case 10.

Thereafter, the shielding plate 42 is inserted into the unit case 10 while the state in which the shielding plate 42 is formed in a cylindrical shape having a diameter smaller than the inside diameter of the unit case 10 is held by using a jig such as tweezers. By releasing the holding at a position at which the shielding plate 42 covers the rear acoustic terminal 12, the diameter of the shielding plate 42 is expanded by the elastic restoring force thereof, and the shielding plate 42 is pressed against the inner surface of the unit case 10.

Figure 6A:
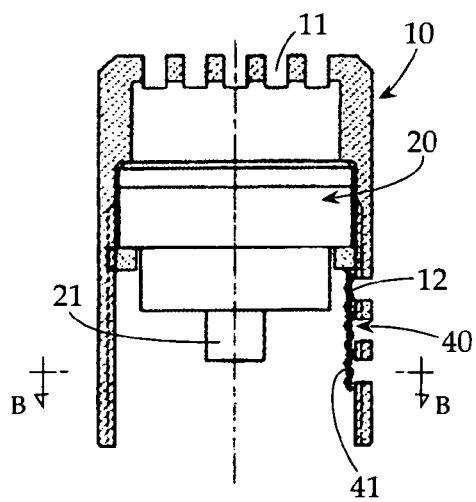
FIG. 6A is a longitudinal sectional view showing an essential portion in which a metal mesh in the conventional example shown in FIG. 4 is mounted on a unit case.
Figure 6B:
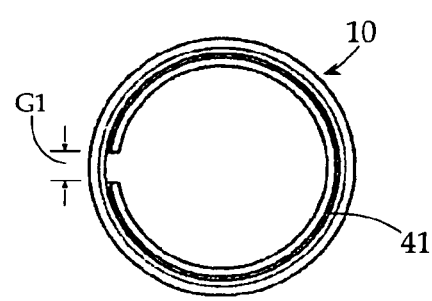
FIG. 6B is a transverse sectional view taken along the line B-B of FIG. 6A.
Figure 7A:
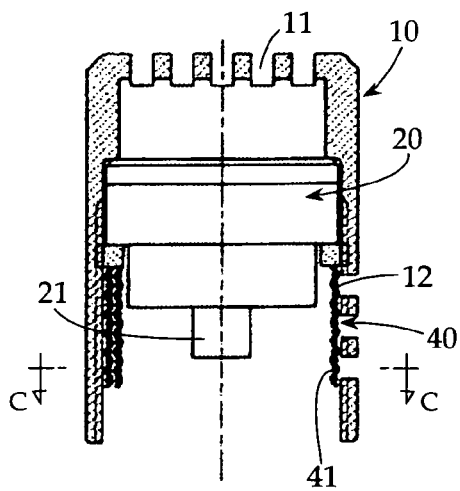
FIG. 7A is a longitudinal sectional view showing an essential portion in which a metal mesh in the conventional example shown in FIG. 4 is mounted on a unit case.
Figure 7B:
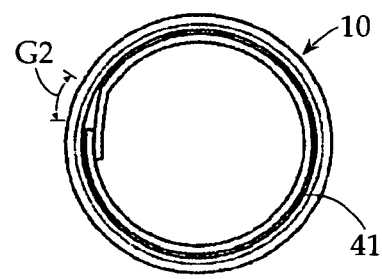
FIG. 7B is a transverse sectional view taken along the line C-C of FIG. 7A.

According to this configuration, even if the diameter of the shielding plate 42 is expanded, the alternately overlapping portion of both end parts 42R and 42L is still present, and the shielding plate itself is a thin sheet about 0.1 mm thick. Therefore, the gaps G1 and G2 shown in FIGS. 6B and 7B are not formed. Thereby, the shield can be made complete, and the shielding plate 42 can be brought into close contact with the rear acoustic terminal 12 on the inner surface of the unit case.

According to the present invention, the shielding plate 42 consists of a porous metal plate (punching metal), and multipoint contact portions that may cause incompleteness of shield are absent unlike the metal mesh used conventionally. Therefore, the shielding plate 42 functions as a shield effective even against strong electromagnetic waves radiated from, for example, cellular phones.

Also, the porous metal plate is pressed against the inner surface of the unit case by an elastic restoring force stronger than that of the metal mesh. Therefore, an auxiliary means, such as a coil spring, described in Japanese Patent Application Publication No. 2008-166909 is unnecessary, and accordingly the porous metal plate is advantageous in terms of cost.

The invention claimed is:

1. A unidirectional condenser microphone unit in which an acousto-electric converter configured so that a diaphragm and a backplate are arranged oppositely via an electrical insulating spacer is incorporated in a cylindrical, metallic unit case having a front acoustic terminal on the front surface thereof and a rear acoustic terminal on the side surface thereof, and a permeable shielding member which covers the rear acoustic terminal from the inside is provided in the unit case, wherein as the shielding member, a shielding plate consisting of a band-shaped and elastic porous metal plate, which has a length longer than the inner periphery length of the unit case, and is provided with a plurality of tongue pieces divided by a slit parallel with the lengthwise direction in both end parts in the lengthwise direction, is used; and the shielding plate is disposed in the unit case in a state in which the shielding plate is formed in a cylindrical shape by overlapping the tongue pieces in both the end parts alternately.

2. The unidirectional condenser microphone unit according to claim 1, wherein the length of the slit is not shorter than the difference between the length of the shielding plate and the inner periphery length of the unit case.

3. The unidirectional condenser microphone unit according to claim 1, wherein the shielding plate is a 0.1 mm thick stainless steel sheet in which 0.3 mm diameter holes are formed in a zigzag pattern at a pitch distance of 0.6 mm.

* * * * *